Figure 1:
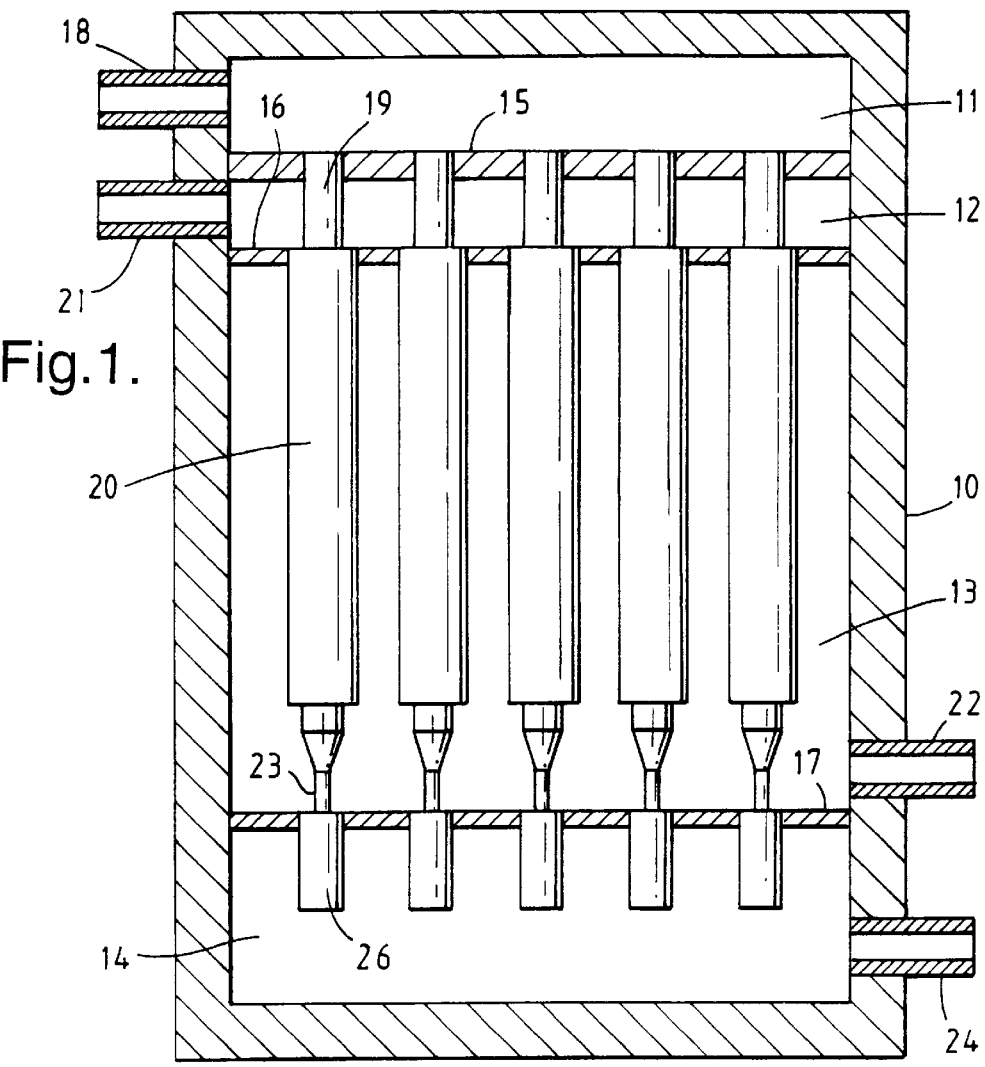

United States Patent

Dunne et al.

[11] Patent Number: 5,958,364
[45] Date of Patent: Sep. 28, 1999

[54] HEAT EXCHANGE APPARATUS AND PROCESS

[75] Inventors: Michael David Dunne, Saltburn; Stephen James O'Nien, Billingham; Peter William Farnell, Middlesbrough, all of United Kingdom

[73] Assignee: Imperial Chemical Industries PLC, London, United Kingdom

[21] Appl. No.: 08/849,023

[22] PCT Filed: Jul. 29, 1996

[86] PCT No.: PCT/GB96/01812

§ 371 Date: May 27, 1997

§ 102(e) Date: May 27, 1997

[87] PCT Pub. No.: WO97/05947

PCT Pub. Date: Feb. 20, 1997

[30] Foreign Application Priority Data

Aug. 7, 1995 [GB] United Kingdom .................. 9516125

[51] Int. Cl.⁶ .................................. C01B 3/26; F28B 1/00
[52] U.S. Cl. ..................... 423/652; 165/110; 165/160; 165/174
[58] Field of Search .................. 165/81, 82, 160, 165/174, 110; 252/373; 423/652, DIG. 6, DIG. 9

[56] References Cited

U.S. PATENT DOCUMENTS 2,458,756  1/1949  Watson ..................................... 165/103
4,871,014  10/1989  Sulzberger ................................ 165/76

FOREIGN PATENT DOCUMENTS 2 258 217  8/1975  France .
1 316 886  5/1973  United Kingdom .
1 320 148  6/1973  United Kingdom .

*Primary Examiner*—Michael Lewis
*Assistant Examiner*—Stuart L. Hendrickson

[57] ABSTRACT

Heat exchange apparatus and process, particularly heat exchange primary reforming with the primary reformed gas being subjected to partial combustion (and optionally secondary reforming) and the resultant partially combusted gas being used as the heat exchange medium to supply heat required for the primary reforming. The apparatus includes process fluid inlet and outlet zones separated from the heat exchange zone by boundary means such as tube sheets or header pipes. A plurality of heat exchange tubes for a process fluid extending through a heat exchange zone from one of the boundary means and slideably engage at the other boundary means with seal tubes fastened to said other boundary means. The interior of the inner one of the seal tube and its associated heat exchange tube is provided with a constriction of reduced cross-sectional area forming a low pressure region downstream of said constriction, an expansion region of cross-sectional area greater than that of the constriction downstream of said constriction, and one or more passages through the wall of that inner tube connecting said low pressure region to the exterior of the inner tube. The passages are located within the overlapping region of the seal tube and heat exchange tube so as to provide a leakage flow path for heat exchange medium from the heat exchange zone through the overlapping region and said passages, into the low pressure region.

10 Claims, 3 Drawing Sheets

HEAT EXCHANGE APPARATUS AND PROCESS

This invention relates to a heat exchange apparatus and process and in particular to a process and apparatus wherein there is liable to be significant differential thermal expansion between tubes carrying a process fluid and means, such as a tube sheet, defining a boundary of the zone through which a heat exchange medium passes in heat exchange with the process fluid passing through the tubes.

In a heat exchanger of the above type a process fluid is passed from a process fluid feed zone, through heat exchange tubes disposed within a heat exchange zone defined by a casing through which a heat exchange medium passes, and then into a process fluid off-take zone. Means, such as tube sheets, are provided to separate the zones. Thus a tube sheet may separate the heat exchange zone through which the heat exchange medium passes from a zone, such as a plenum chamber, communicating with the interior of the heat exchange tubes to permit feed of process fluid to the tubes or off-take of process fluid from the tubes. An alternative arrangement involves the use of header pipes disposed within the heat exchange zone to define the process fluid feed zone: the process fluid is fed to the header pipes from whence it flows into and through the heat exchange tubes. Similarly header pipes may be provided for the off-take of process fluid from the tubes. Alternatively there may be a combination of tube sheets and header pipes, for example the process fluid may be fed to the heat exchange tubes from a plenum chamber separated from the heat exchange zone by a tube sheet while header pipes are provided disposed within the heat exchange zone for off-take of process fluid from the tubes. Such tube sheets or headers are herein termed boundary means as they define boundaries between the heat exchange zone and the process fluid feed and off-take zones.

In some applications, such as steam reforming of hydrocarbons, the heat exchange tubes are of considerable length, typically several meters, and there is a large temperature difference, often several hundred ° C., e.g. 500 to 1000° C. or more, between the cold, i.e. ambient, state and normal process operation. As a result the tubes expand longitudinally by a considerable amount, often 10 cm or more, relative to the casing to which the boundary means is fastened. Normal practice is to provide pigtails at one or both ends of the tubes to permit such differential expansion so that the pigtails, rather than the tubes themselves are fastened to boundary means. Alternatively bellows arrangements are often employed to permit such expansion. However pigtails or bellows arrangements able to accommodate differential expansion of the order of 10 cm or more present practical difficulties.

In some types of heat exchange apparatus, the heating exchange medium is the process fluid that has passed through the tubes but which has been subjected to further processing before being used as the heat exchange medium. For example the tubes may be filled with a steam reforming catalyst and a hydrocarbon feedstock mixed with steam is passed through the tubes: the latter are heated by a heat exchange medium to supply the necessary heat for the endothermic primary steam reforming reaction to give a primary reformed gas. The resultant primary reformed gas is then subjected to partial oxidation where the primary reformed gas is partially combusted with oxygen or air and, in some cases, the process known as secondary reforming, is then passed through a secondary reforming catalyst bed. The resultant partially combusted gas, by which term we include secondary reformed gas, is then used as the heat exchange medium heating the tubes. An example of this type of process and heat exchange apparatus for effecting the primary reforming is described in GB 1 578 270.

In a modification of this type of process the boundary means at the outlet end of the heat exchange tubes is omitted. The tubes open into a zone into which a gas such as air or oxygen is introduced so that partial combustion of the primary reformed gas takes place and the resultant partially combusted gas passes back past the tubes heating the latter. Examples of this type of process and apparatus are described in U.S. Pat. No. 2,579,843, U.S. Pat. No. 4,919,844 and GB 2 181 740. While this type of arrangement obviates the problems associated with differential thermal expansion of the tubes, it however presents problems where it is desired to pass the partially combusted gas through a bed of secondary reforming catalyst prior to using the partially combusted gas to heat the tubes. There have also been proposals, for example in U.S. Pat. No. 4,337,170 and U.S. Pat. No. 5,264,202, to use this type of reformer, where the heat exchange tubes are "open-ended" at the outlet end so that the reformed gas leaving the tubes is in communication with the heat exchange zone, to effect reforming of a feedstock by passing the feedstock, and steam, through the tubes which are heated by primary reformed gas produced in a conventional reformer. The aforesaid U.S. Pat. No. 4,337,170 also suggests that the primary reformed gas from the conventional reformer may be subjected to secondary reforming prior to mixing with the gas emanating from the tubes of the heat exchange reformer and use as the heating medium therefore.

In the present invention these problems are overcome by providing one of the boundary means with seal tubes which engage with the heat exchange tubes but to which they are not fastened so that the seal tubes provide positional location for the heat exchange tubes while permitting sliding movement between the seal and heat exchange tubes to accommodate the differential expansion. There is however inevitably a leakage path between the zones on either side of the boundary means through the clearance spaces between the seal tubes and heat exchange tubes necessarily provided to permit such sliding movement. Because of the high temperatures normally encountered in use, the provision of a sliding leak-proof, e.g. gas tight, seal for this clearance gap presents problems. The leakage path allows the process fluid, e.g. primary reformed gas, to pass into the heat exchange medium, e.g. partially combusted gas, or vice versa. The direction of the leakage will of course depend on the relative pressures of the process fluid and the heat exchange medium. Generally, where the heat exchange medium is the product of further processing of the process fluid, the process fluid will be at a higher pressure than the heat exchange medium, for example as a result of pressure drops encountered during passage of the process fluid through the further processing before use as the heat exchange medium. This means that the predominant leakage will be of the process fluid into the heat exchange medium, which means that some of the process fluid will by-pass the further processing. Such bypassing of the further processing is generally undesired. Thus where the process gas is the product of primary steam reforming a hydrocarbon feedstock in the tubes, the methane content of the primary reformed process gas is typically 10% or more by volume, whereas the product of secondary steam reforming the primary reformed gas typically has a methane content of less than 1%, usually less than 0.5%, by volume. If 5% of the process gas leaks into the heat exchange zone, i.e. bypasses the secondary reforming stage, the resultant mixture of the secondary reformed gas and the leaked primary reformed gas would have a methane content typically double that of the secondary reformed gas. Not only does this mean that a significant amount of methane has not been reformed, but also this "slipped" methane generally acts as an inert gas in subsequent processes such as ammonia synthesis thus rendering the latter less efficient.

We have devised an arrangement wherein, despite the heat exchange medium being at a somewhat lower pressure than the process fluid leaving the tubes, the predominant leakage is of heat exchange medium into the process fluid.

Accordingly the present invention provides heat exchange apparatus including a process fluid feed zone, a heat exchange zone, and a process fluid off-take zone, first and second boundary means separating said zones from one another, a plurality of heat exchange tubes fastened to one of said boundary means and extending through the heat exchange zone whereby process fluid can flow from the process fluid feed zone, through the heat exchange tubes and into the process fluid off-take zone, and, for each heat exchange tube, a seal tube fastened to the other of said boundary means, each seal tube being disposed substantially coaxially with its associated heat exchange tube such that each seal tube is in sliding engagement with its associated heat exchange tube thereby defining an overlapping region where the heat exchange and seal tubes overlap one another whereby thermal expansion of the heat exchange tubes can be accommodated within the overlapping region, the inner tube of said heat exchange tube and its associated seal tube being provided with an interior constriction of reduced cross sectional area forming a low pressure region downstream, in the direction of flow of said process fluid, of said constriction, an expansion region of cross sectional area greater than that of the constriction downstream of said constriction, and one or more passages through the wall of the inner tube connecting said low pressure region to the exterior of the inner tube, said passages being located within said overlapping region thereby providing a flow path for fluid from the heat exchange zone through said overlapping region into said low pressure region within said inner tube.

The invention also provides a process wherein a process fluid is subjected to a processing step comprising feeding a process fluid to a process fluid feed zone separated from a heat exchange zone by boundary means, passing said process fluid from said process fluid feed zone through a plurality of heat exchange tubes extending through said heat exchange zone wherein said process fluid is subjected to heat exchange with a heat exchange medium in said heat exchange zone, passing the process fluid from said heat exchange tubes to a process fluid off-take zone separated from said heat exchange zone by second boundary means, subjecting the process fluid from said process fluid off-take zone to the desired processing step, and passing the resultant processed process fluid through the heat exchange zone as the heat exchange medium, said heat exchange tubes being fastened to one of said boundary means and, for each heat exchange tube, there is provided a seal tube fastened to the other of said boundary means, each seal tube being disposed substantially coaxially with its associated heat exchange tube such that each seal tube is in sliding engagement with its associated heat exchange tube thereby defining an overlapping region where the heat exchange and seal tubes overlap one another whereby thermal expansion of the heat exchange tubes can be accommodated within the overlapping region, the inner tube of said heat exchange tube and its associated seal tube being provided with an interior constriction of reduced cross sectional area forming a low pressure region downstream, in the direction of flow of said process fluid, of said constriction, an expansion region of cross sectional area greater than that of the constriction downstream of said constriction, and one or more passages through the wall of the inner tube connecting said low pressure region to the exterior of the inner tube, said passages being located within said overlapping region thereby providing a flow path for fluid from the heat exchange zone through said overlapping region into said low pressure region within the inner tube, said process being operated such that the pressure of the processed process fluid fed to the heat exchange zone is greater than the pressure in the low pressure region, whereby part of the processed process fluid fed to the heat exchange zone passes through said clearance space and said passages into said low pressure region.

The process and apparatus are of particular utility for steam reforming hydrocarbons wherein a mixture of a hydrocarbon feedstock and steam is passed through the heat exchange tubes which contain a steam reforming catalyst so as to form a primary reformed gas which is then subjected to partial combustion with an oxygen-containing gas, e.g. air, and the resultant partially combusted gas is used as the heating fluid in the heat exchange zone. Preferably the partially combusted gas is passed through a bed of a secondary reforming catalyst, so as to effect further reforming, before being used as the heat exchange fluid.

As a result of the constriction in the inner one of the heat exchange and seal tubes, a low pressure region is formed within the inner tube downstream of the constriction: by suitably sizing the constriction, the pressure in the low pressure region when in normal operation can be made lower than the pressure in the heat exchange zone so that there is a flow of heat exchange medium, e.g. the product of secondary reforming the process fluid taken from the process fluid off-take zone, from the heat exchange zone through the clearance space and through said passages into the low pressure region. Downstream of the low pressure region the process fluid expands in the expansion region giving a process fluid pressure greater than that in the low pressure region. Consequently there will also be a backflow, or recycle, of process fluid from the outlet end of the inner tube, through the clearance space, to the passages and into the low pressure region.

The seal is preferably provided at the boundary means between the heat exchange zone and the process fluid off-take zone. Thus the seal tubes are fastened to that boundary means while the heat exchange tubes are fastened to the boundary means, e.g. tube sheet, between the process fluid inlet zone and the heat exchange zone. This is particularly preferred where the heat exchange medium is the result of further processing of the process fluid from the process fluid off-take zone and the process fluid undergoes a substantial pressure drop as it passes through the heat exchange tubes, for example where the latter contain a catalyst: in such cases it may be difficult to provide for the pressure reduction given by the constriction to exceed that of the pressure drop encountered as the process fluid passes through the heat exchange tubes plus any pressure drop that the process fluid undergoes during the further processing before it is employed as the heat exchange medium. However providing the seal at the boundary means between the process fluid inlet zone and the heat exchange zone may have advantages in some cases. For example, where the process fluid undergoes a chemical reaction as it passes through the heat exchange tubes, the process fluid at the inlet end of the heat exchange tubes may have a different density enabling a greater pressure reduction to be achieved by the constriction and/or the composition may be such that the process fluid is less corrosive at the inlet end of the heat exchange tubes. Furthermore the temperature at the inlet end of the heat exchange tubes may be lower so that the seal is operating at lower temperatures.

The seal tubes may be disposed such that the heat exchange tubes slide inside the seal tubes: in that case the heat exchange tubes are the inner tubes and have the constriction in their interior. In this case the seal tubes may project into the heat exchange zone from the boundary means or may extend back from the boundary means into the zone, i.e. process fluid inlet or off-take zone, on the other side of the boundary means. The heat exchange tubes may extend from the boundary means to which they are fastened, through the heat exchange zone, and through the seal tubes fastened to the other boundary means, and may project into the zone, i.e. process fluid inlet or off-take zone, on the other side of the boundary means to which the seal tubes are fastened. Alternatively the seal tubes may be disposed such that they slide inside the heat exchange tubes. In this case the seal tubes are the inner tubes and have the constriction in their interior. In this case the seal tubes extend into the heat exchange zone from the boundary means to which they are fastened.

Figure 2:
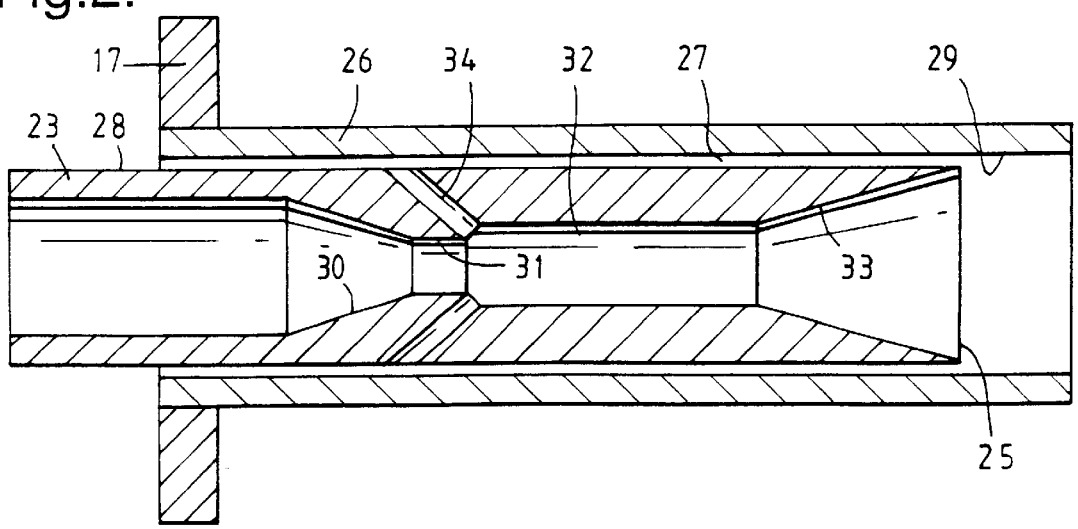
Figure 3:
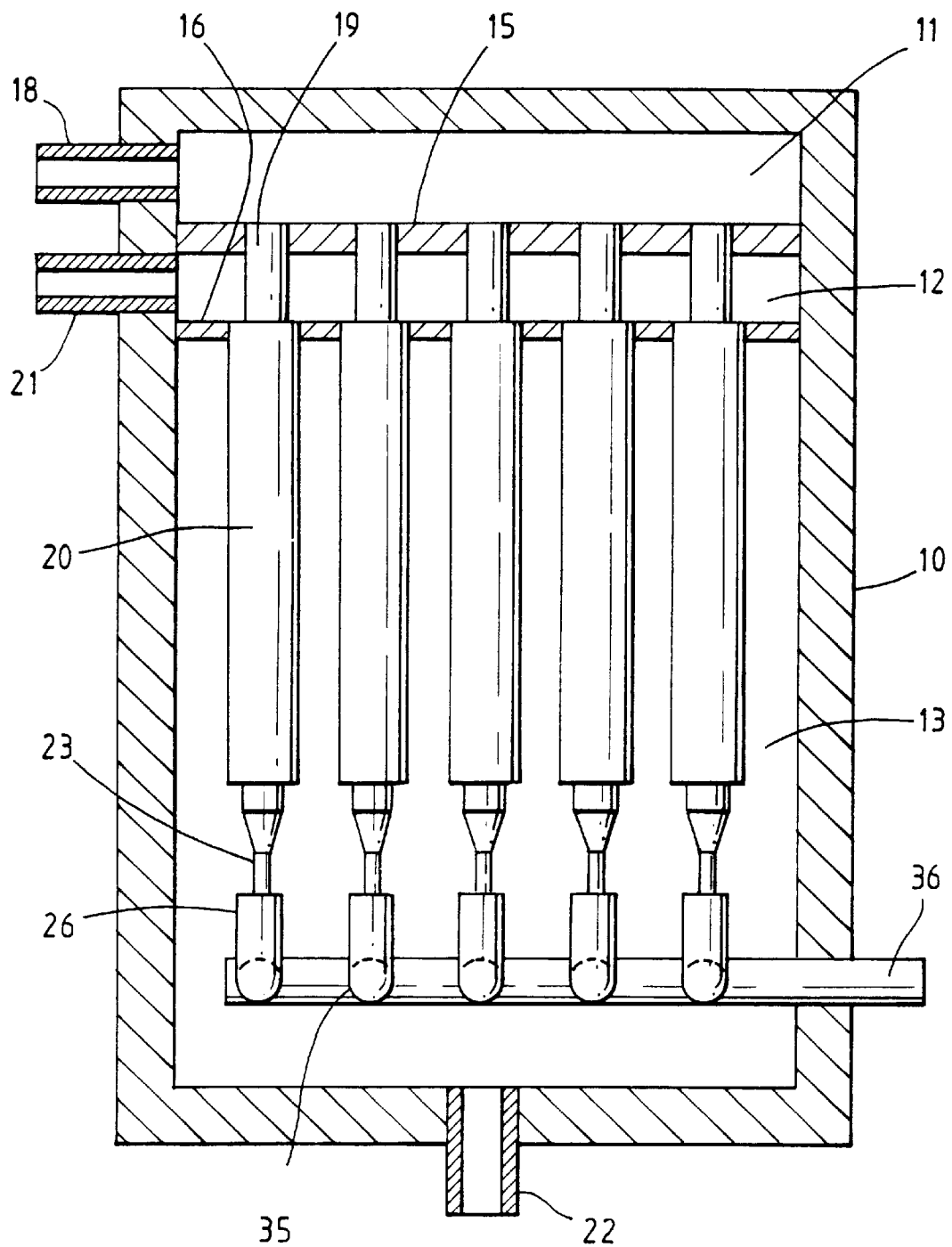

Several embodiments of the invention are illustrated by reference to the accompanying drawings wherein FIG. 1 is a diagrammatic cross section of a heat exchange apparatus according to a first embodiment of the invention wherein the boundary means are tube sheets, FIG. 2 is a cross section of the lower end of one of the tubes of the first embodiment showing the associated tube sheet and seal tube, and FIG. 3 is a diagrammatic cross section, similar to FIG. 1, but of a second embodiment wherein the boundary means bearing the seal tubes is a header.

Figure 4:
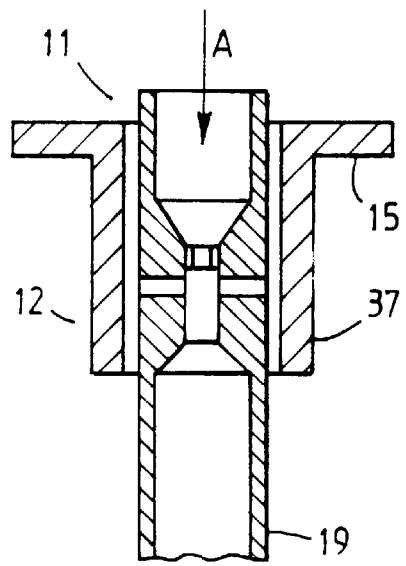
Figure 5:
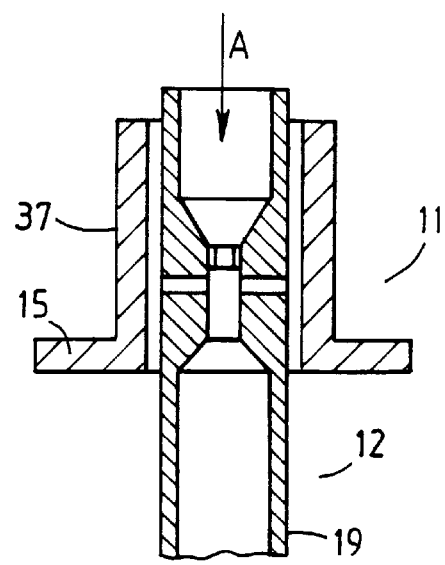
Figure 6:
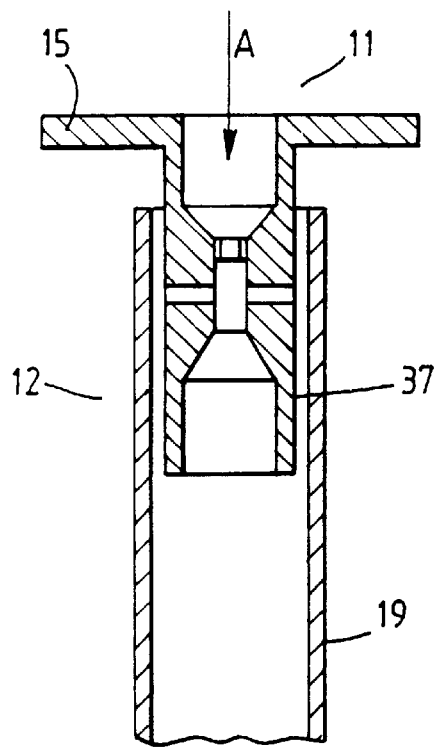

FIGS. 4 to 6 are diagrammatic cross sections of various alternative seal arrangements.

In FIG. 1 there is shown heat exchange apparatus, such as a heat exchange reformer, having an outer insulated pressure shell 10 enclosing four zones 11, 12, 13, 14 defined by the shell walls and tube sheets 15, 16, 17.

Zone 11, a process fluid feed zone, is defined by the shell walls and tube sheet 15 and is provided with a feed supply conduit 18 and has a plurality of heat exchange tubes, e.g. reforming tubes, 19 fastened to, and extending downwards from, tube sheet 15. The number of tubes employed will depend on the scale of operation: although only five tubes are shown in FIG. 1 there may be typically be 50 or more such tubes. For steam reforming, the tubes 19 will be filled with a suitable steam reforming catalyst, for example nickel on a support of a refractory material such as alumina, zirconia or a calcium aluminate cement. The reforming catalyst is normally in the form of shaped units random packed in the tubes. Typically the shaped units have a maximum dimension of less than about one fifth of the reforming tube diameter and may be in the form of cylinders having a passage, or preferably more than one passage, extending longitudinally through the cylinder.

Zone 12, a heat exchange medium off-take zone, forms the second, minor, part of a heat exchange zone, and is defined by the shell walls and tube sheets 15 and 16. Heat exchange tubes 19 extend through zone 12 and through tube sheet 16. Each tube 19 is provided with a surrounding annular sleeve 20, fastened to and extending down from, tube sheet 16. The interior of sleeves 20 communicates with zone 12 so that heat exchange medium passing up the space between the interior wall of sleeve 20 and the exterior wall of the tube 19 associated with that sleeve can pass into zone 12. Zone 12 is also provided with a heat exchange medium outlet conduit 21.

Zone 13 is the first, major, part of the heat exchange zone and is bounded by the walls of shell 10 and tube sheets 16 and 17. A heat exchange medium inlet conduit 22 is provided at the lower end of zone 13. Tubes 19 extend through zone 13 and through the tube sheet 17 at the lower end of zone 13. Each sleeve 20 is open at its lower end and terminates towards the lower end of zone 13 so that heat exchange fluid supplied to zone 13 via conduit 22 can enter the annular space between the interior surface of sleeve 20 and the external surface of the tube 19 associated therewith. The tubes 19 each have a portion 23 of reduced cross section at the lower ends beneath sleeves 20 and passing through the tube sheet 17.

Zone 14, the process fluid off-take zone, is defined by the walls of shell 10 and the tube sheet 17, and is provided with a process fluid outlet conduit 24. The lower portions 23 of the tubes 19 pass through tube sheet 17 and are open at their lower ends 25 (see FIG. 2) thus enabling process fluid from tubes 19 to pass into zone 14 and thence out through conduit 24.

It is therefore seen that, considering the two portions 12, 13 of the heat exchange zone as a single heat exchange zone, the process fluid inlet zone 11 is separated from the heat exchange zone by tube sheet 15 forming boundary means to which the heat exchange tubes 19 are fastened, and the heat exchange zone is separated from the process fluid off-take zone 14 by tube sheet 17 through which the ends of the heat exchange tubes 19 pass.

As shown in FIG. 2, the lower portions 23 of tubes 19 are not fastened to tube sheet 17. So that thermal expansion of the heat exchange tubes 19 relative to the shell 10 can be accommodated, each tube portion 23 extends into a seal tube 26 fastened to tube sheet 17 and extending into zone 14. The portion 23 of tube 19 extending into seal tube 26 forms an overlapping region having a small clearance gap 27 between the exterior surface 28 of the lower portion 23 of tubes 19 and the interior surface 29 of the seal tube 26 associated therewith. Typically this clearance is of the order of 0.05 to 3 mm. Within the overlapping region where the tube portion 23 is within seal tube 26, the interior of lower portion 23 of tube 19 has a conical section 30 leading to a cylindrical constriction region 31 of reduced cross sectional area. Typically the cross sectional area of this constriction region 31 is about 15–50% of the cross sectional area of the lower portion 23 of the tubes 19. Downstream of the constriction region 31 is provided a cylindrical low pressure region 32 of cross sectional area greater than that of the constriction region but less than that of the lower portion 23 of tubes 19. The lower portion 23 of tubes 19 terminates in an internally flared region 33. Within the overlapping region, passages 34 are provided through the wall of the lower portion 23 of tubes 19 communicating with the low pressure region 32 downstream of the constriction region 31.

Provided the pressure of the process fluid flowing down tubes 19 at the inlet to conical region 30 is not too much greater than the pressure of the heat exchange medium entering zone 13 via conduit 22, by suitable selection of the dimensions of the constriction region 31 and low pressure region 32, it is possible to arrange that, in normal operation, the pressure in the low pressure region 32 resulting from the flow of process fluid through the constriction region 31 into the low pressure region 32 is less than the pressure of the heat exchange medium entering the heat exchange zone 13 via conduit 22. Consequently there will be a flow of heat exchange medium from zone 13, through the clearance gap 27 in the overlapping region and through passages 34, into the low pressure region 32. The pressure at the outlet end 25 of the heat exchange tubes 19 will also be greater than that in the low pressure region 32, and so there will also be a recycle flow of process fluid from the outlet end of heat exchange tube 19 through clearance gap 27 and passages 34 into the low pressure region 32.

It will be appreciated that since leakage of the heat exchange medium past tube sheet 17 into the low pressure region is permitted, instead of providing a narrow clearance gap between the seal tube 26 and the lower portion 23 of the heat exchange tube 19, a larger gap can be employed with a simple mechanical seal permitting sliding movement. Failure of the seal will thus permit flow of heat exchange medium past the seal into the low pressure region 32. Thus a suitable packing that permits sliding movement may be provided at the upper end of the seal tube 26 in the clearance gap 27 between the exterior walls 28 of the lower portion 23 of tube 19 and the interior wall of seal tube 26 to reduce still further the leakage of heat exchange medium from zone 13 into zone 14.

While it is not essential that the heat exchange tubes 19 have lower portions 23 of decreased cross-section, i.e. the tubes 19 could be of full cross section on passage through tube sheet 17 with the seal tubes 26 appropriately sized, the provision of a lower portion 23 of reduced cross-section facilitates design and construction of the "leakage" paths.

In an alternative arrangement, sleeves 20 and tube sheet 16 are omitted so that the heat exchange zone is not divided into a major heat exchange portion and a minor heat exchange medium outlet portion, but is simply a single zone through which the heat exchange medium flows from inlet conduit 22 and leaves through outlet conduit 21.

In the embodiment of FIG. 3, the lower tube sheet 17, the process fluid off-take zone 14 and the process fluid outlet conduit 24 of FIG. 1 are replaced by a series of header pipes 35 connected to a process fluid outlet conduit 36 extending through the vessel wall. The heat exchange medium enters the vessel at the lower end through conduit 22 and passes up, through the spaces between adjacent header pipes 35 and past the lower ends of the tubes 19, into the sleeves 20. The seal tubes 26 are fastened to the header pipes 35 and extend upwardly from header pipes 35 into the heat exchange zone 13. The seal arrangement is similar to that shown in FIG. 2 except that, as mentioned above, the tube sheet 17 is omitted and the seal tubes 26 extend upwards from the header pipes 35.

FIGS. 4, 5, and 6 show alternative arrangements with the seal at the upper, process fluid feed, end of the heat exchange tubes. The direction of flow of the process fluid is indicated by arrow A. In these arrangements, not shown in FIGS. 4 to 6, the heat exchange tubes 19 are fastened to boundary means, e.g. a tube sheet or header pipes, separating the heat exchange zone from the process fluid off-take zone. In the embodiments of FIGS. 4 and 5, the seal tubes 37 are fastened to tube sheet 15 forming the boundary means between the process fluid inlet zone 11 from the second, minor, portion 12 of the heat exchange zone. In FIG. 4 the seal tubes extend down from tube sheet 15 into the portion 12 of the heat exchange zone, while in FIG. 5, the seal tubes extend up from tube sheet 15 into the process fluid inlet zone 11. In the arrangement of FIG. 6, the seal tube 37 is disposed within the upper end of heat exchange tube 19. In each of these arrangements, the interior of the inner tube, i.e. heat exchange tube 19 in FIGS. 4 and 5, and seal tube 37 in FIG. 6, is provided with a constriction, low pressure region, expansion region, and passages through the inner tube walls in similar fashion to that described above in relation to FIG. 2. In these arrangements, the heat exchange medium can flow from heat exchange zone portion 12 through the clearance gap between the heat exchange tube 19 and seal tube 37, though the passages into the low pressure region downstream of the constriction within the inner one of the tubes.

In a calculated example using the embodiment of FIGS. 1 and 2, natural gas is desulphurised by the addition of a small proportion of a hydrogen/nitrogen mixture recovered from ammonia purge gas and passed through a bed of a hydrodesulphurisation catalyst and a bed of zinc oxide acting as an absorbent for hydrogen sulphide. Steam is added and the resultant mixture (stream A), pre-heated to 406° C., is fed to the process fluid feed zone 11 of a reformer via conduit 18 and primary reformed in heat exchange tubes 19 of internal diameter 125 mm and length 10 m containing a random packed steam reforming catalyst of nickel on a calcium aluminate cement support in the form of cylinders of 17.6 mm length and 14.0 mm diameter having four axially extending cylindrical through passages of 4.0 mm diameter. The catalyst was supported on a restraining grid positioned at the upper end of the transition region where the reforming tubes decreased in diameter to form the lower portions 23, so that the lower portions 23, which had an internal diameter of 25 mm, were free from catalyst. The temperature and pressure of the reformed process gas (stream B) entering the lower portion 23 of the reformer tubes 19 were 722° C. and 40.0 bar abs. respectively. The resultant reformed gas passed through the constriction region 31 and low pressure region 32, giving rise to a pressure of 38.6 bar abs. in the low pressure region and a pressure of 39.3 bar abs. at the outlet end 25 of the tubes 19. As described below there was a leakage stream C of gas from heat exchange zone 13 into process fluid off-take zone 14 via passages 34 and low pressure region 32.

The reformed process gas (stream D), consisting of the stream B plus the leakage stream C, was then fed via conduit 24 to a secondary reformer wherein it was subjected to partial combustion with an air stream E which had been preheated to 650° C., and subjected to secondary reforming by passing the partially combusted mixture through a random packed bed of a secondary reforming catalyst of nickel supported on cylinders of calcium aluminate cement. The secondary reforming catalyst cylinders had a length of 17.6 mm, a diameter of 14.0 mm, and had four axially extending cylindrical through passages of 4.0 mm diameter. The secondary reformed gas (stream F), at a pressure of 38.8 bar abs. and a temperature of 970° C. was then fed to the heat exchange zone 13 via conduit 22. Part (stream C) of the secondary reformed gas stream F leaked from zone 13 into zone 14 through passages 34 and low pressure region 32, while the remainder (stream G) was used as the heat exchange medium heating the heat exchange tubes 19 as stream G passed up through the annular space within sleeves 20 to zone 12. The temperature of the product gas (stream H) leaving zone 12 via conduit 21 was 530° C.

The lower portion 23 of tubes had an internal dimension of 25 mm, tapering to a constriction region 31 of 12 mm internal diameter and expanding to a low pressure region 32 of 18 mm internal diameter and 108 mm length. The open end of the tube flared from the 18 mm diameter of the low pressure region 32 to the 31 mm external diameter of the lower portion 23 of tubes 19 over a length of 78 mm. Twelve recycle passages 34 of 3 mm diameter were provided between the low pressure region 32 and the annular clearance gap 27. The thickness of the annular clearance gap 27 between seal tubes 26 and the exterior surface 28 of the lower portion 23 of the tubes 19 was 0.2 mm. The length of the lower portions 23 of tubes 19 and of the seal tubes 26 was sufficient that the recycle passages 34 and open ends 25 of the tubes 19 were within the seal tubes 26 both at start up, i.e. with the apparatus at ambient temperature and at normal operating temperature. It was calculated that, at the normal operating temperature, despite the pressure of the stream B at the inlet to the conical region 30 being 1.2 bar above the pressure of the secondary reformed gas, stream F, entering the zone 13, about 3% of the reformed process gas leaving the open ends 25 of tubes 19 was recycled through the clearance gap 27 and recycle passages 34 and about 3% of the secondary reformed gas (stream F) entering zone 13 likewise passed, as leakage stream C, through tubesheet 17 to the low pressure region 32 via clearance gap 27 and passages 34.

The flow rates (rounded to the nearest 0.1 kmol/h) of the components of the various streams, together with the stream temperatures and pressures, are shown in the following Table I.

TABLE I

| | Flow rate (kmol/h), temperature (°C.), and pressure (bar abs.) of stream | | | | | | | |
|---|---|---|---|---|---|---|---|---|
| | A | B | C | D | E | F | G | H |
| $CH_4$ | 560.0 | 428.2 | 0.5 | 428.7 | 0.0 | 15.5 | 15.0 | 15.0 |
| $C_2H_6$ | 23.1 | 0.0 | 0.0 | 0.0 | 0.0 | 0.0 | 0.0 | 0.0 |
| $C_3H_8$ | 4.3 | 0.0 | 0.0 | 0.0 | 0.0 | 0.0 | 0.0 | 0.0 |
| $C_4H_{10}$ | 3.2 | 0.0 | 0.0 | 0.0 | 0.0 | 0.0 | 0.0 | 0.0 |
| CO | 0.0 | 69.3 | 12.6 | 82.0 | 0.0 | 421.1 | 408.5 | 408.5 |
| $CO_2$ | 3.0 | 137.3 | 6.5 | 143.9 | 0.4 | 218.3 | 211.8 | 211.8 |
| $H_2O$ | 1719.1 | 1381.1 | 45.4 | 1426.4 | 4.6 | 1511.8 | 1466.5 | 1466.5 |
| $H_2$ | 256.8 | 960.9 | 52.8 | 1013.7 | 0.0 | 1759.2 | 1706.5 | 1706.5 |
| $N_2$ | 113.5 | 113.5 | 36.2 | 149.7 | 1055.5 | 1205.2 | 1169.0 | 1169.0 |
| $O_2$ | 0.0 | 0.0 | 0.0 | 0.0 | 284.0 | 0.0 | 0.0 | 0.0 |
| Ar | 0.0 | 0.0 | 0.4 | 0.4 | 12.6 | 13.0 | 12.6 | 12.6 |
| Temp. | 406 | 722 | 970 | 732 | 650 | 970 | 970 | 530 |
| Pressure | 43.7 | 40.0 | 38.8 | 39.3 | 40.0 | 38.8 | 38.8 | 38.3 |

In a calculated comparative example, it was assumed that the lower portion of tubes 23 had no constriction region or low pressure region and no recycle passages, but were of 25 mm internal diameter for the whole of their length. The reformed gas leaving the end 25 of the tubes was thus at a pressure of 40.0 bar abs. so that the leakage of gas was from the process fluid off-take zone 14 through annular clearance gap 27 to heat exchange zone 13.

The flow rates (rounded to the nearest 0.1 kmol/h) of the components of the various streams, together with the stream temperatures and pressures, are shown in the following table II.

TABLE II

| | Flow rate (kmol/h), temperature (°C.), and pressure (bar abs.) of stream | | | | | | | |
|---|---|---|---|---|---|---|---|---|
| | A | B | C | D | E | F | G | H |
| $CH_4$ | 560.0 | 428.2 | 21.4 | 406.8 | 0.0 | 14.2 | 35.6 | 35.6 |
| $C_2H_6$ | 23.1 | 0.0 | 0.0 | 0.0 | 0.0 | 0.0 | 0.0 | 0.0 |
| $C_3H_8$ | 4.3 | 0.0 | 0.0 | 0.0 | 0.0 | 0.0 | 0.0 | 0.0 |
| $C_4H_{10}$ | 3.2 | 0.0 | 0.0 | 0.0 | 0.0 | 0.0 | 0.0 | 0.0 |
| CO | 0.0 | 69.3 | 3.5 | 65.9 | 0.0 | 388.1 | 391.6 | 391.6 |
| $CO_2$ | 3.0 | 137.3 | 6.9 | 130.4 | 0.4 | 201.2 | 208.1 | 208.1 |
| $H_2O$ | 1719.1 | 1381.1 | 69.1 | 1312.0 | 4.4 | 1393.7 | 1462.7 | 1462.7 |
| $H_2$ | 256.8 | 960.9 | 48.0 | 912.8 | 0.0 | 1620.8 | 1668.8 | 1668.8 |
| $N_2$ | 113.5 | 113.5 | 5.7 | 107.8 | 1003.9 | 1111.7 | 1117.4 | 1117.4 |
| $O_2$ | 0.0 | 0.0 | 0.0 | 0.0 | 270.1 | 0.0 | 0.0 | 0.0 |
| Ar | 0.0 | 0.0 | 0.0 | 0.0 | 12.0 | 12.0 | 12.0 | 12.0 |
| Temp. | 406 | 722 | 722 | 722 | 650 | 970 | 961 | 515 |
| Pressure | 43.7 | 40.0 | 40.0 | 40.0 | 40.0 | 38.8 | 39.3 | 38.8 |

The above processes, involving primary and secondary reforming with air, are designed to produce reformed gas for use in the production of ammonia. Since in an ammonia plant, the reformed gas is normally subjected to the shift reaction wherein essentially all the carbon monoxide reacts with steam to produce carbon dioxide and hydrogen, the amount of hydrogen that could be obtained (the hydrogen equivalent), which in turn determines the amount of ammonia that can be produced, equals the sum of the hydrogen and carbon monoxide contents of stream H.

Because of the leakage of the gas from process fluid off-take zone 14 into heat exchange zone 13 in the comparison case, the temperature of the gas employed as the heat exchange medium is decreased. Also in the comparison the flow rate to the secondary reformer is decreased and so less air has to be employed to obtain the secondary reformer exit temperature. In turn this means that the amount of gas (stream F) leaving the secondary reformer is decreased, and so, despite being augmented, rather than depleted, by the leakage stream C, the amount of gas (stream G) available for use as heat exchange medium is decreased. This decrease in amount and temperature of the heat exchange medium, stream F, means that in order to obtain the same amount of reforming in heat exchange tubes 19, the temperature of the product gas, stream H, leaving the reformer via conduit 21 is lower, thus decreasing the amount of heat that can be recovered from that gas stream.

Salient points arising from the above comparison can be seen in the following Table III.

TABLE III

|  | Leakage from zone 13 to zone 14 (invention) | Leakage from zone 14 to zone 13 (comparison) |
| --- | --- | --- |
| $H_2$ equivalent of stream H | 2115.0 kmol/h | 2060.4 kmol/h |
| Methane content of stream H | 0.3% | 0.7% |
| Total flow of stream D | 3244.6 kmol/h | 2935.8 kmol/h |
| Air employed | 1357.2 kmol/h | 1290.8 kmol/h |
| Total flow of stream G | 4989.8 kmol/h | 4896.1 kmol/h |
| Temperature of stream G | 970° C. | 961° C. |
| Temperature of stream H | 530° C. | 515° C. |

It is seen from Table III that the hydrogen equivalent, and hence potential ammonia production, for the invention case is about 2.65% greater than the comparison case. In addition the amount of ammonia that can be produced also depends upon the methane content of the reformed gas since the methane represents an inert material in the subsequent ammonia synthesis: an increase in the methane content of the reformed gas, as in the comparison case, means that the amount of purge required in the subsequent ammonia synthesis loop has to be increased, with consequent decrease in the amount of ammonia produced. Consequently the amount of ammonia that could be produced in the case according to the invention will be significantly more than 2.6% greater than the comparison case.

Although described above primarily in relation to heat exchange reforming, it will be appreciated that the invention is also of utility in other heat exchange applications where considerable differential thermal expansion has to be accommodated and leakage of the heat exchange medium into the process fluid is not objectionable. Examples include feed/effluent heat exchangers, for example where the feed to a process step such as an exothermic reaction, e.g. methanol or ammonia synthesis, is heated by heat exchange with the effluent from the process step. In such cases the heat exchange tubes may be free of catalyst unless it is desired, as in the aforementioned reforming process, that a catalytic reaction is effected on the process fluid while it is undergoing the heat exchange.

We claim:

1. Heat exchange apparatus including a process fluid feed zone, a heat exchange zone and a process fluid off-take zone, first and second dividing means separating said zones from one another, a plurality of heat exchange tubes fastened to one of said dividing means and extending through the heat exchange zone whereby process fluid can flow from the process fluid feed zone, through the heat exchange tubes and into the process fluid off-take zone, and, for each heat exchange tube, a seal tube fastened to the other of said dividing means, each seal tube being disposed substantially coaxially with its associated heat exchange tube such that each seal tube is in sliding engagement with its associated heat exchange tube thereby defining an overlapping region where the heat exchange and seal tubes overlap one another whereby thermal expansion of the heat exchange tubes can be accommodated within the overlapping region, the inner tube of said heat exchange tube and its associated seal tube being provided with (i) an interior constriction of reduced cross sectional area forming, within said inner tube and said overlapping region, a low pressure region, (ii) an expansion region of cross sectional area greater than that of the constriction downstream of said low pressure region, and (iii) one or more passages through the wall of the inner tube connecting said low pressure region to the exterior of the inner tube, said passages being located within said overlapping region thereby providing a flow path for fluid from the heat exchange zone through said overlapping region into said low pressure region within said inner tube.

2. Heat exchange apparatus according to claim 1 wherein said other dividing means comprises a tube sheet through which said tubes extend.

3. Heat exchange apparatus according to claim 1 wherein said other dividing means comprises header pipes connected to a process fluid off-take conduit.

4. Heat exchange apparatus according to claim 1 wherein the heat exchange tubes are fastened to the dividing means between the process fluid inlet zone and the heat exchange zone.

5. Heat exchange apparatus according to claim 1 in the form of a heat exchange reformer operatively connected to partial combustion means designed to effect partial combustion of the process fluid after the latter has passed through the tubes and to supply the gas, after said partial combustion, to the heat exchange reformer as the heat exchange fluid.

6. Heat exchange apparatus according to claim 5 wherein the partial combustion means includes a bed of secondary reforming catalyst through which the partially combusted gas passes before supply thereof to the heat exchange reformer as the heat exchange fluid.

7. A process wherein a process fluid is subjected to a heat exchange step and then a processing step comprising feeding a process fluid to a process fluid feed zone separated from a heat exchange zone by dividing means, passing said process fluid from said process fluid feed zone through a plurality of heat exchange tubes extending through said heat exchange zone wherein said process fluid is subjected to heat exchange with a heat exchange medium in said heat exchange zone, passing the process fluid from said heat exchange tubes to a process fluid off-take zone separated from said heat exchange zone by second dividing means, subjecting the process fluid from said process fluid off-take zone to said processing step, and passing the resultant processed process fluid through the heat exchange zone as the heat exchange medium, said heat exchange tubes being fastened to one of said dividing means and, for each heat exchange tube, there is provided a seal tube fastened to the other of said dividing means, each seal tube being disposed substantially coaxially with its associated heat exchange tube such that each seal tube is in sliding engagement with its associated heat exchange tube thereby defining an overlapping region where the heat exchange and seal tubes overlap one another whereby thermal expansion of the heat exchange tubes can be accommodated within the overlapping region, the inner tube of said heat exchange tube and its associated seal tube being provided with (i) an interior constriction of reduced cross sectional area forming, within said inner tube and said overlapping region, a low pressure region, (ii) an expansion region, within said inner tube, of cross sectional area greater than that of the constriction downstream of said low pressure region, and (iii) one or more passages through the wall of the inner tube connecting said low pressure region to the exterior of the inner tube, said passages being located within said overlapping region thereby providing a flow path for fluid from the heat exchange zone through said overlapping region into said low pressure region within said inner tube, said process being operated such that the pressure of the processed process fluid fed to the heat exchange zone is greater than the pressure in the low pressure region, whereby part of the processed process fluid fed to the heat exchange zone passes through said overlapping region and said passages into said low pressure region.

8. A process according to claim 7 for the steam reforming of a hydrocarbon feedstock wherein the process fluid fed to the process fluid feed zone comprises a mixture of a hydrocarbon feedstock and steam, said heat exchange tubes are fastened to the boundary means between said process fluid feed zone and the heat exchange zone and contain a steam reforming catalyst and the seal tubes are fastened to the boundary means separating the heat exchange zone from the process fluid off-take zone, whereby said mixture is subjected to steam reforming in said heat exchange tubes to give a primary reformed gas stream, passing said primary reformed gas stream from said heat exchange tubes to the process fluid off-take zone, subjecting the primary reformed gas from said process fluid off-take zone to partial combustion with an oxygen-containing gas, and passing the resultant partially combusted gas through the heat exchange zone so as to heat said heat exchange tubes.

9. A process according to claim 8 wherein the partially combusted gas is passed through a bed of a secondary reforming catalyst before being fed to said heat exchange zone.

10. Heat exchange apparatus according to claim 4 wherein each inner tube is the lower portion of a heat exchange tube and the low pressure region within the inner tube and overlapping region has a cross sectional area greater than that of the constriction but less than that of the lower portion of the heat exchange tube upstream of the constriction.

* * * * *